United States Patent
Kang et al.

(10) Patent No.: US 11,754,464 B2
(45) Date of Patent: Sep. 12, 2023

(54) WIND TUNNEL TEST EQUIPMENT USING WIND FORCE INTEGRATION

(71) Applicant: Seoul National University R&DB Foundation, Seoul (KR)

(72) Inventors: Thomas Hyun Koo Kang, Seoul (KR); Hamidreza Alinejad Lashkariani, Siheung-si (KR); Byeong Uk An, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 27 days.

(21) Appl. No.: 17/624,353

(22) PCT Filed: Jul. 31, 2020

(86) PCT No.: PCT/KR2020/010139
§ 371 (c)(1),
(2) Date: Jan. 3, 2022

(87) PCT Pub. No.: WO2021/157797
PCT Pub. Date: Aug. 12, 2021

(65) Prior Publication Data
US 2022/0291080 A1    Sep. 15, 2022

(30) Foreign Application Priority Data
Feb. 6, 2020  (KR) .......... 10-2020-0014279

(51) Int. Cl.
*G01M 9/02*    (2006.01)
*G01M 9/06*    (2006.01)

(52) U.S. Cl.
CPC ............ *G01M 9/02* (2013.01); *G01M 9/06* (2013.01)

(58) Field of Classification Search
CPC .......... G01M 9/02; G01M 9/06; G01M 9/062; G01M 9/08
See application file for complete search history.

(56) References Cited

U.S. PATENT DOCUMENTS

2010/0054916 A1* 3/2010 Zheng .................. G01M 9/06
                                                                      415/118

FOREIGN PATENT DOCUMENTS

| CN | 205333290 U | | 6/2016 | |
|---|---|---|---|---|
| JP | 10-253493 A | | 9/1998 | |
| JP | 10253493 A | * | 9/1998 | .............. G01M 9/06 |
| KR | 20-0266533 Y1 | | 2/2002 | |
| KR | 200266533 | * | 2/2002 | .............. G01M 9/00 |
| KR | 10-1571032 B1 | | 11/2015 | |

OTHER PUBLICATIONS

International Search Report for PCT/KR2020/010139 dated Oct. 27, 2020 from Korean Intellectual Property Office.

* cited by examiner

*Primary Examiner* — Freddie Kirkland, III
(74) *Attorney, Agent, or Firm* — Revolution IP, PLLC

(57) ABSTRACT

A wind tunnel test equipment using wind force integration includes: a structural model whose interior is empty; an internal support disposed inside the structural model; and load sensors disposed outside the internal support and coming into close contact with the inner surfaces of the structural model to measure aerodynamic forces applied to the structural model.

5 Claims, 11 Drawing Sheets

WIND TUNNEL TEST EQUIPMENT USING WIND FORCE INTEGRATION

TECHNICAL FIELD

The present invention relates to wind tunnel test equipment using wind force integration that is capable of directly measuring aerodynamic forces applied to a structural model as reaction forces through load sensors disposed between the external walls of the structural model and an internal support, so that wind loads applied to a given height can be measured with accurate values, not with approximate values, and capable of measuring local loads applied to external wall segments of the structural model to accurately design exterior materials and to calculate accurate load distributions to base reaction forces based on the accurate load values.

BACKGROUND ART

A wind load is one of important considerations in the design of structures such as buildings, bridges and the like, together with a gravity load.

Figure 1:
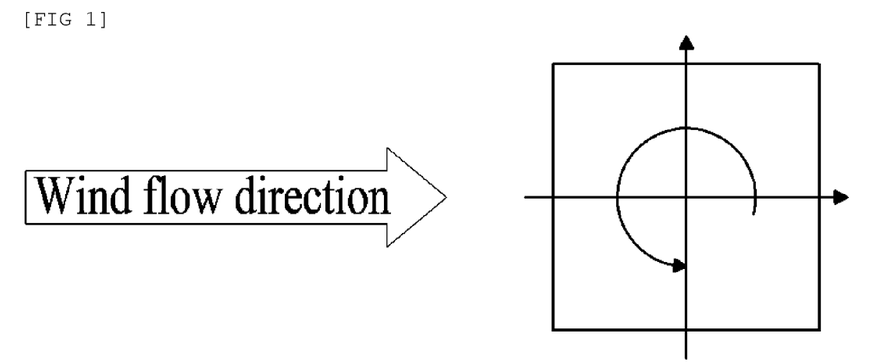
FIG. 1 is a schematic view showing plane loads applied from an aerodynamic force.

In the case of mid/low-rise buildings or structures having a short fundamental period, the wind load acts as a static load generated from a wind pressure applied to external walls. The wind load is the load applied directly to a structure through wind flows, and dominated by characteristics of air flow such as wind speed and its distribution and aerodynamic characteristics created by the shape of the structure. As shown in FIG. 1, plane loads generated by aerodynamic forces include an along-wind load parallel with a wind flow direction, an across-wind load perpendicular to the wind flow direction, and a torsional wind load with respect to a vertical axis.

In addition to the aerodynamic forces, resonant forces as additional loads generated by the dynamic characteristics of the velocity pressure may be created from a structure having a relatively long fundamental period of greater than 1 second.

Most of current building codes suggest just design procedures for structures having a simple shape and dimension within a set wind speed range. However, real structures are frequently out of the limitations of the building codes, and accordingly, wind tunnel tests for the structures have to be necessarily carried out so as to calculate wind loads.

Like this, the measurement of the wind loads applied to the structure is one of the principal objects of the wind tunnel test, and according to wind load measurement methods, in conventional practices, the wind tunnel test is classified into an aeroelastic wind tunnel test and an aerodynamic wind tunnel test.

Figure 2:
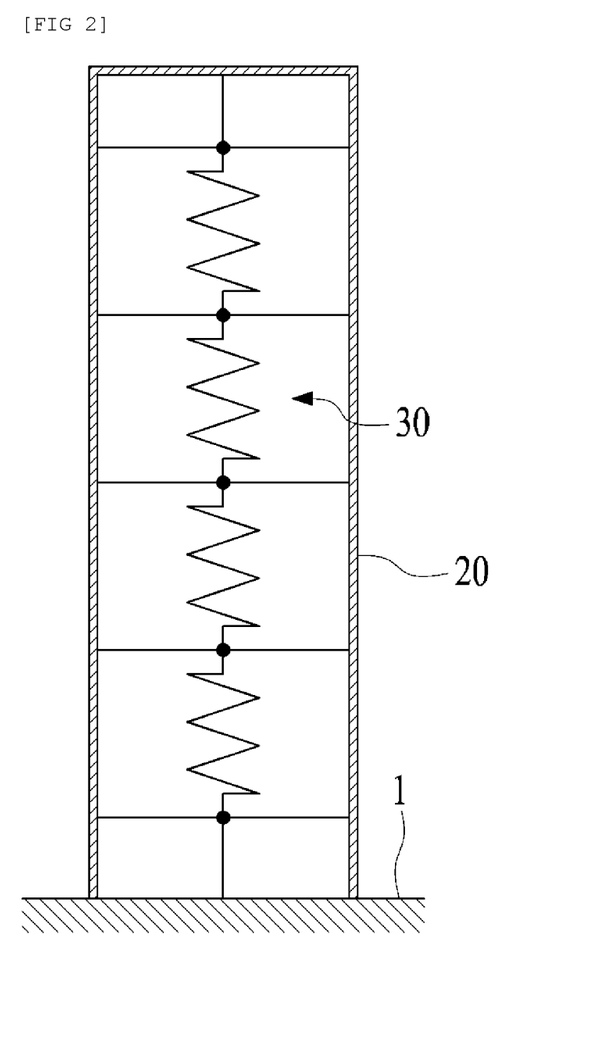
FIG. 2 is a schematic view showing an aeroelastic structural model for a wind tunnel test.

The aeroelastic wind tunnel test is the most accurate wind load measurement method in which aerodynamic forces and resonant forces are measured directly in the process of the test (See FIG. 2). A structural model for the aeroelastic wind tunnel test is made by scaling the outer shape of a structure related to aerodynamic characteristics and an internal structural system of the structure. Referring to FIG. 2, a reference numeral 20 represents a structural model, and a reference numeral 30 a structural system.

To consider an interaction between ground and the structure, additionally, the structural system may be attached to a soft or rigid base plate, and the external walls of the structural model are attached to the structural system through soft or rigid connectors according to the stiffness of slabs. In the aeroelastic wind tunnel test using the aeroelastic structural model, loads are measured directly from the internal structural system.

In the process of making the structural model, it is relatively easy to scale the outer shape of the structure, but the structural system has to have three elements, that is, mass, stiffness, and damping. However, it is very difficult that the damping is scaled appropriately to the same level as real level.

When the structural model is made, as a result, the structural system is unfortunately simplified as a system that considers only some dynamic modes.

Unlike the aeroelastic wind tunnel test, the aerodynamic wind tunnel test uses a rigid structural model, measures only the aerodynamic forces, and has post-processing in which the measured aerodynamic forces are inputted to numerical analysis models to obtain the resonant forces.

In the aerodynamic wind tunnel test, aerodynamic force measurement methods generally include a high frequency pressure integration (HFPI) method and a high frequency force balance (HFFB) method.

Figure 3:
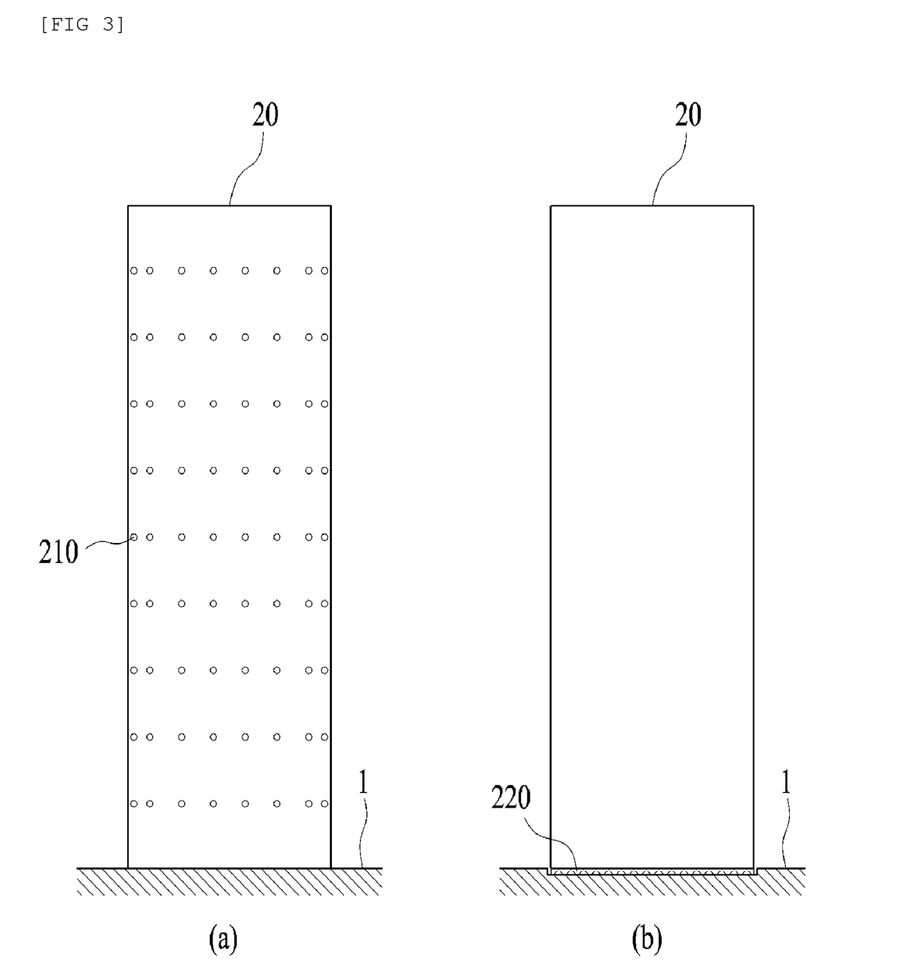
FIG. 3 illustrates schematic views (a)-(b) showing aerodynamic structural models using HFPI and HFFB methods.

As shown in FIG. 3a, the HFPI method makes use of a structural model 20 having numerous pressure taps 210 attached to the external walls thereof. In this case, pressure tap tubes for measuring wind pressure have to be disposed inside the structural model 20, and accordingly, the structural model 20 is empty in an interior thereof. Loads are calculated based on an integral value of the wind pressure measured through the pressure taps with respect to the influence areas of the external walls. As there are local pressures measured locally on the external walls, the calculated local pressure values can be used directly in the design of exterior materials. Additionally, wind pressure distributions according to heights can be obtained from the measurement results, and the obtained wind pressure distributions can be used usefully to build numerical analysis models.

However, the HFPI method has a limitation on the accuracy of the measurement values that is dependent upon the number of pressure taps and the arrangements of the pressure taps. Since complex air flows are generated on corners, generally, a relatively large number of pressure taps should be attached to the corners. If the outer shape of the structural model is not regular by means of protruding portions such as balconies, a degree of accuracy of the measurement values becomes low and a great number of pressure taps are needed. However, a space in which the pressure tap tubes are disposed is formed limitedly inside the structural model, which causes the number of pressure taps really attached to be restricted. Besides, the reaction force of the base surface of the structure is an approximate value calculated through the integration of wind pressure with respect to the acting areas of the wind pressure, which expresses a low degree of accuracy.

As shown in FIG. 3b, an HFFB structural model 20 is a rigid model, like the HFPI structural model, but the HFFB structural model 20 is different from the HFPI structural model in that the base surface thereof is not fixed. That is, the base surface of the structural model 20 is not fixed, and the structural model 20 is installed on a load measurement device called a force balance device 220 to measure the reaction forces to the aerodynamic forces through the force balance device 220.

Accordingly, only the reaction forces of the base surface are measured through the wind tunnel test, and load distributions according to heights are not calculated, so that when the numerical analysis for post-processing is carried out, vertical distributions of the loads are assumed by the determination in engineering.

The HFFB method is very useful for the structure having simple shape so that it is not hard to assume its vertical distribution patterns, but it is very hard that the HFFB method is applied to a structure having an irregular shape. In the HFFB method, further, the local pressures of the external walls cannot be obtained, so that the test results cannot be applied directly to the design of exterior materials.

DISCLOSURE

Technical Problem

Accordingly, the present invention has been made to solve the above-mentioned problems, and it is an object of the present invention to provide wind tunnel test equipment using wind force integration that is capable of being configured to directly measure aerodynamic forces applied to external walls of a structural model as reaction forces, instead of measuring pressures applied to the external walls of the structural model, so that wind loads applied to a given height can be measured with accurate values, not with approximate values.

It is another object of the present invention to provide wind tunnel test equipment using wind force integration that is capable of allowing local loads applied to external wall segments of a structural model to be calculated to accurately design exterior materials and to calculate accurate load distributions to base reaction forces based on the accurate load values.

It is yet another object of the present invention to provide wind tunnel test equipment using wind force integration that is capable of easily recycling load sensors, thereby providing economical advantages.

Technical Solution

To accomplish the above-mentioned objects, according to the present invention, there is provided wind tunnel test equipment using wind force integration including: a structural model whose interior is empty; an internal support disposed inside the structural model; and load sensors disposed outside the internal support and coming into close contact with the inner surfaces of the structural model to measure aerodynamic forces applied to the structural model.

According to the present invention, desirably, the structural model may have a plurality of segments formed dividedly on the external walls thereof.

According to the present invention, desirably, the neighboring segments may have a sealing material disposed therebetween.

According to the present invention, desirably, the internal support may be a rigid core.

According to the present invention, desirably, the internal support may be an equivalent dynamic model of a structural system of a structure.

Advantageous Effects

According to the present invention, the wind tunnel test equipment using wind force integration according to the present invention can be configured to directly measure aerodynamic forces applied to the structural model as reaction forces through the load sensors disposed between the external walls of the structural model and the internal support, so that wind loads applied to a given height can be measured with accurate values, not with approximate values.

Further, the wind tunnel test equipment using wind force integration according to the present invention can be configured to allow wind loads to be accurately calculated through the load sensors even in the case of the structure having various shapes. In specific, the wind loads can be accurately measured just through a small number of load sensors, and further, if the load sensors are added, a degree of accuracy in calculating load distributions using interpolation can be improved.

In addition, the wind loads applied to a given height can be accurately measured, and accordingly, the accurately measured values can be very usefully used in the numerical analysis process.

Moreover, the load sensors and the internal support are simply coupled to the structural model, and after the test, they are separated and reused several times, thereby providing economical advantages and being eco-friendly through the reduction of waste.

Additionally, in the case where the structural model has the plurality of segments formed dividedly on the external walls thereof, the local loads applied to the respective segments can be calculated to accurately design exterior materials and to calculate accurate load distributions to base reaction forces based on the accurate load values.

BEST MODE FOR INVENTION

To accomplish the above-mentioned objects, wind tunnel test equipment using wind force integration according to the present invention includes: a structural model whose interior is empty; an internal support disposed inside the structural model; and load sensors disposed outside the internal support and coming into close contact with the inner surfaces of the structural model to measure aerodynamic forces applied to the structural model.

MODE FOR INVENTION

Hereinafter, the present invention will be described in detail with reference to the attached drawings.

Figure 4:
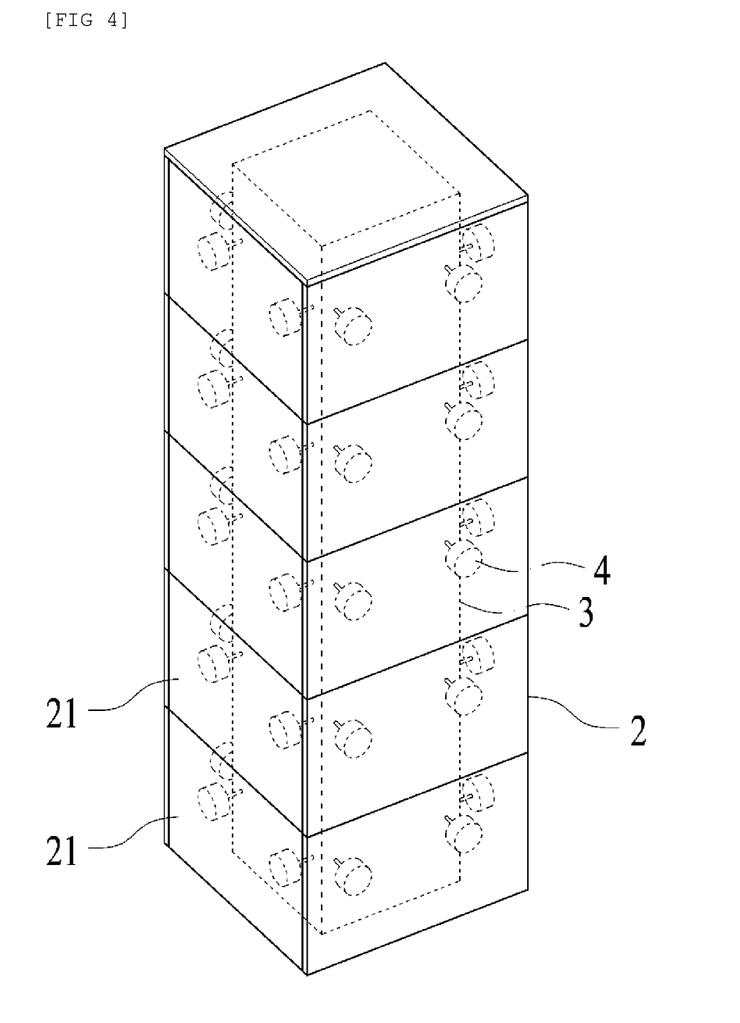
FIG. 4 is a perspective view showing wind tunnel test equipment using wind force integration according to the present invention.
Figure 5:
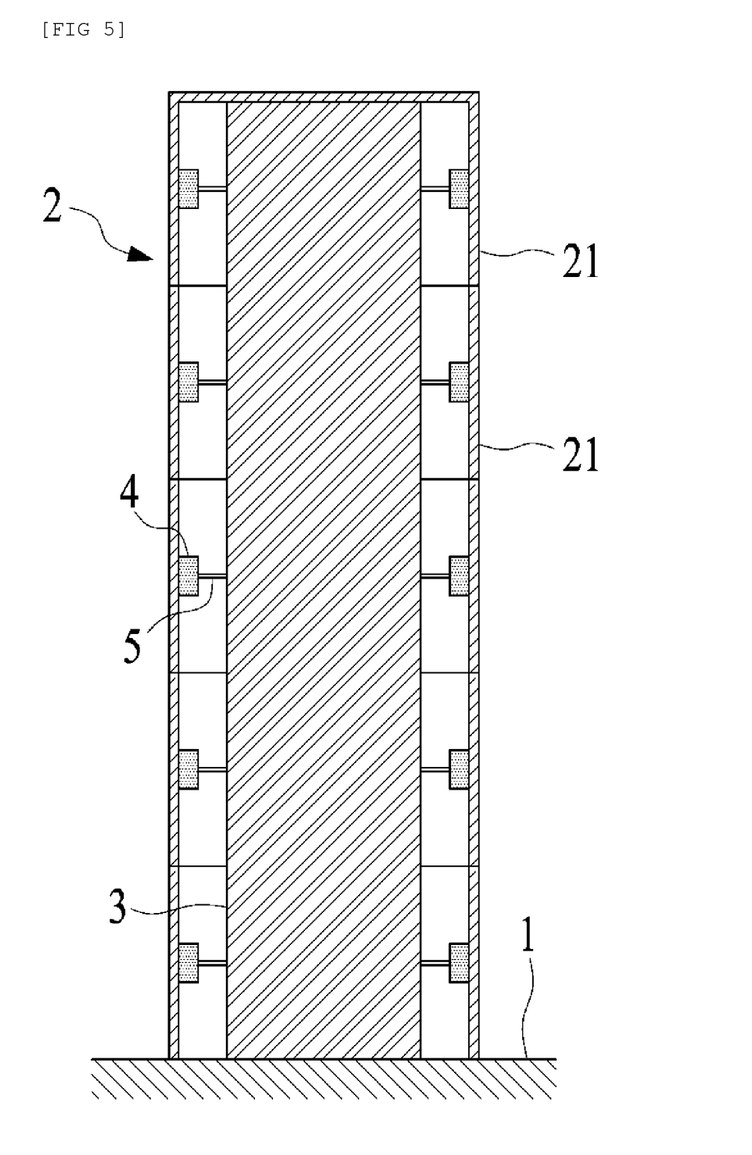
FIG. 5 is a longitudinal sectional view showing the wind tunnel test equipment using wind force integration according to the present invention.
Figure 6:
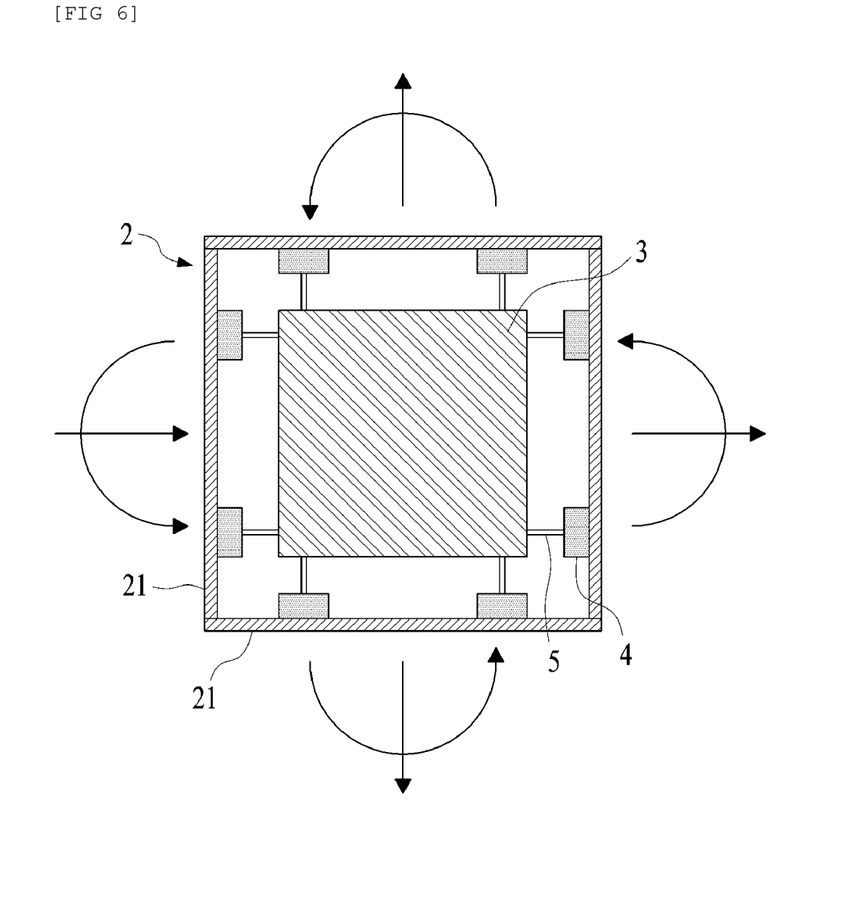
FIG. 6 is a transverse sectional view showing the wind tunnel test equipment using wind force integration according to the present invention.
Figure 7:
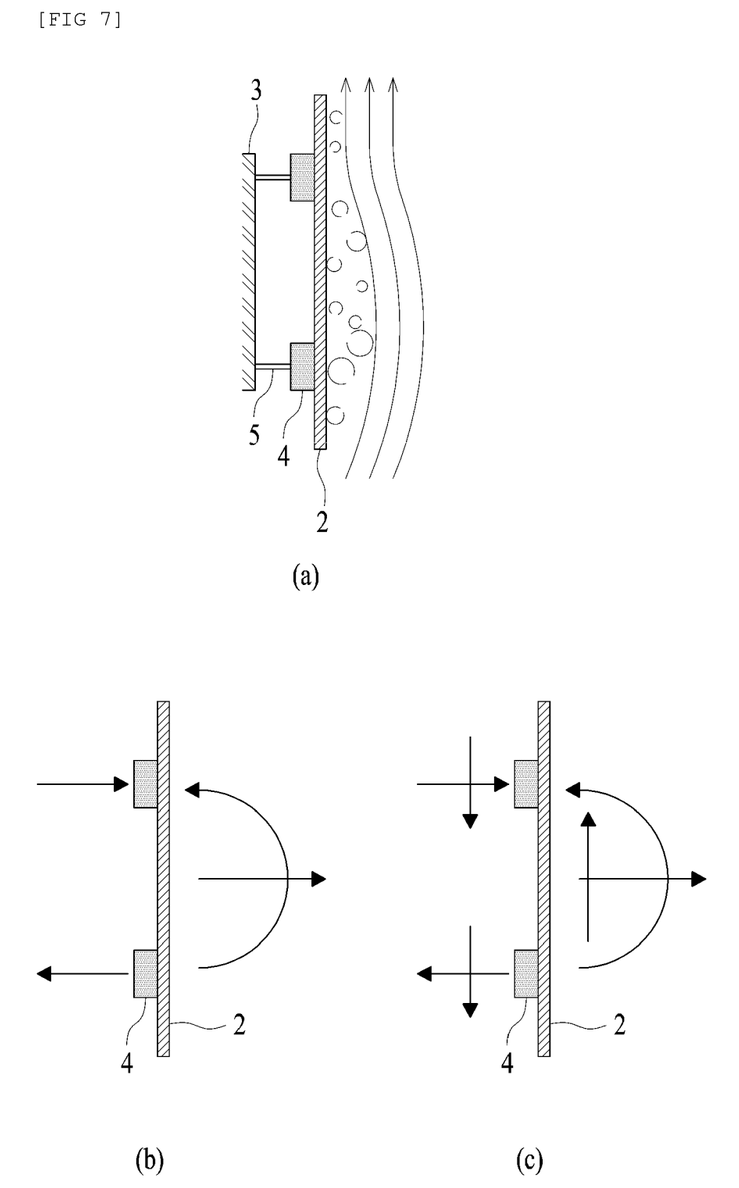
FIG. 7 illustrates schematic views (a)-(c) showing vertical reaction forces and shear forces measured according to the present invention.
Figure 8:
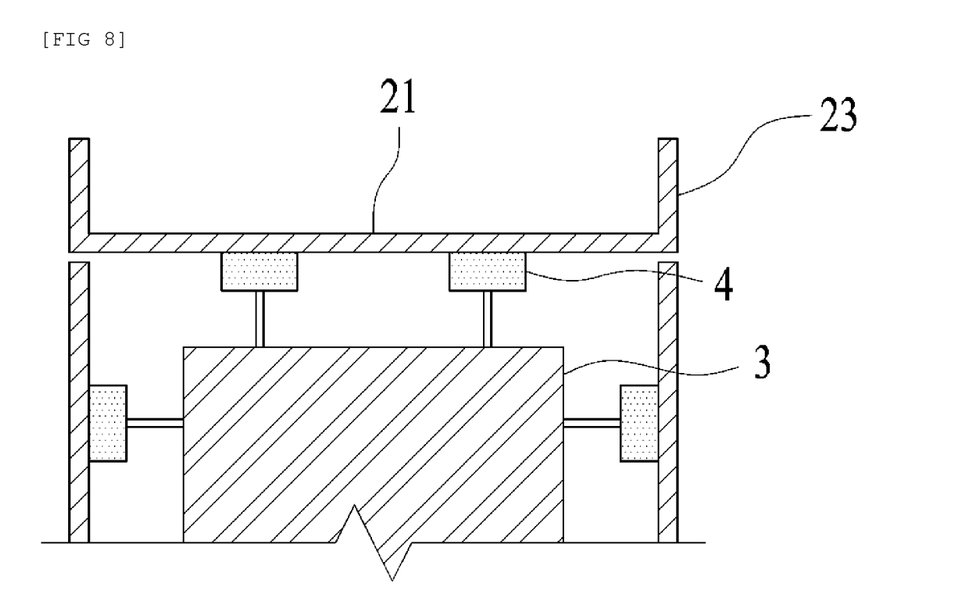
FIG. 8 is a longitudinal sectional view showing the wind tunnel test equipment for a structural model having parapets according to the present invention.
Figure 9:
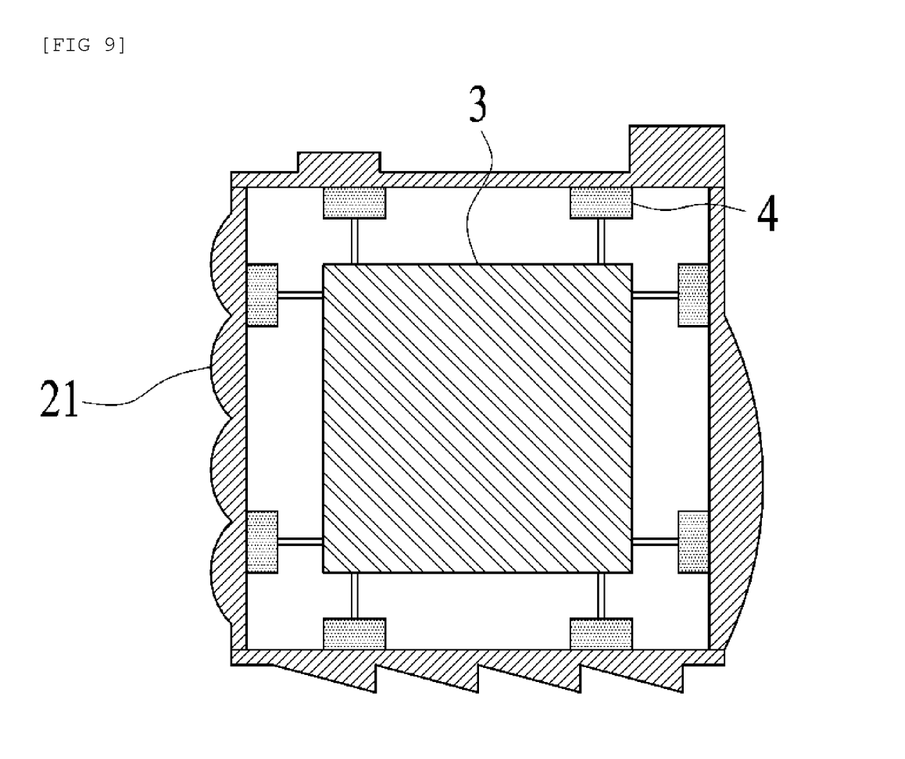
FIG. 9 is a transverse sectional view showing the wind tunnel test equipment for a structural model having various elevational shapes according to the present invention.
Figure 10:
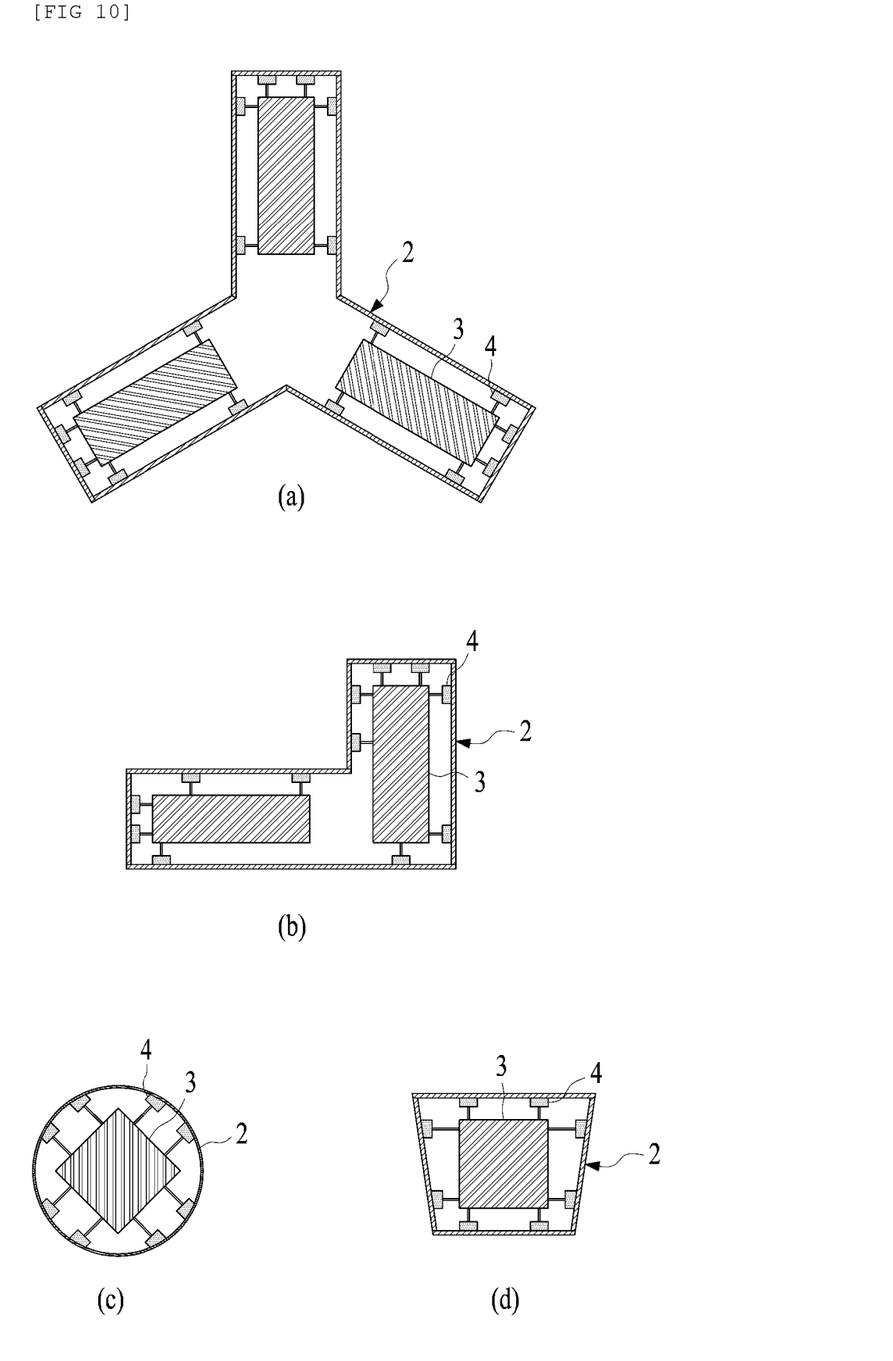
FIG. 10 illustrates schematic views (a)-(d) showing the wind tunnel test equipment having various plan shapes according to the present invention.
Figure 11:
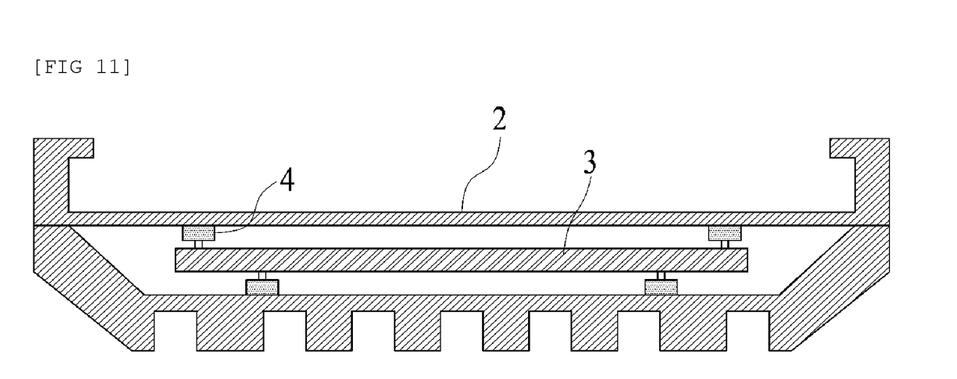
FIG. 11 is a longitudinal sectional view showing the wind tunnel test equipment for a bridge according to the present invention.

FIG. 4 is a perspective view showing wind tunnel test equipment using wind force integration according to the present invention, FIG. 5 is a longitudinal sectional view showing the wind tunnel test equipment using wind force integration according to the present invention, FIG. 6 is a transverse sectional view showing the wind tunnel test equipment using wind force integration according to the present invention, FIGS. 7a to 7c are schematic views showing vertical reaction forces and shear forces measured according to the present invention, FIG. 8 is a longitudinal sectional view showing the wind tunnel test equipment for a structural model having parapets according to the present invention, FIG. 9 is a transverse sectional view showing the wind tunnel test equipment for a structural model having various elevational shapes according to the present invention, FIGS. 10a to 10d are schematic views showing the wind tunnel test equipment having various plan shapes according to the present invention, and FIG. 11 is a longitudinal sectional view showing the wind tunnel test equipment for a bridge according to the present invention.

As shown in FIGS. 4 to 6, wind tunnel test equipment using wind force integration according to the present invention includes: a structural model 2 whose interior is empty; an internal support 3 disposed inside the structural model 2; and load sensors 4 disposed outside the internal support 3 and coming into close contact with the inner surfaces of the structural model 2 to measure aerodynamic forces applied to the structural model 2.

So as to solve the problems the conventional wind tunnel test equipment has had, the wind tunnel test equipment using wind force integration according to the present invention is configured to directly measure the aerodynamic forces applied to wall bodies as reaction forces, instead of measuring pressures applied to external walls of the structural model 2, so that wind loads applied to a given height can be measured with accurate values, not with approximate values.

Further, the wind tunnel test equipment using wind force integration according to the present invention is configured to measure local loads applied to external wall segments 21 of the structural model 2 to accurately design exterior materials, to calculate accurate load distributions to base reaction forces based on the accurate load values, and to easily reuse the load sensors 4 to provide economical advantages.

The wind tunnel test equipment using wind force integration according to the present invention largely includes the structural model 2, the internal support 3, and the load sensors 4.

The structural model 2 is a model that is made by scaling an outer shell of a real structure and has an empty interior.

The internal support 3 is disposed inside the structural model 2.

The internal support 3 may have various shapes such as a truss support, a hollow support, and a solid support.

The load sensors 4 are disposed outside the internal support 3 and come into close contact with the inner surfaces of the structural model 2 to measure aerodynamic forces applied to the structural model 2.

The load sensors 4 are disposed between the external walls of the structural model 2 and the internal support 3. Accordingly, the loads applied to the external walls of the structural model 2 are measured through the load sensors 4.

The load sensors 4 are selected from various sensors such as strain gauges, load cells, piezoelectric gauges, pressure gauges, and the like.

The measured values of the load sensors 4 are the same as the loads applied from the aerodynamic forces.

The loads applied from the aerodynamic forces exhibit the sum of the loads applied to the respective external walls.

The plurality of load sensors 4 are appropriately arranged on the respective surfaces of the structural model 2 to measure loads and moments.

As the aerodynamic forces are directly measured through the load sensors 4, they can be measured with accurate values, not with approximate values.

FIG. 7a shows air flows applied to the structural model 2.

According to the present invention, as shown in FIG. 7b, the load sensors 4 can measure vertical reaction forces with respect to the wall surface, and as shown in FIG. 7c, the load sensors 4 can measure vertical reaction forces and shear forces with respect to the wall surface.

In the conventional HFPI method, only the forces applied normal to the wall surface are measured, and accordingly, the forces applied in parallel with the wall surface, that is, shear forces cannot be measured.

According to the present invention, however, if the load sensors 4 are the sensors capable of measuring shear forces, the shear forces applied to the structural model 2 can be calculated (See FIGS. 7a to 7c).

The internal support 3 and the external walls of the structural model 2 are spaced apart from each other. Accordingly, the load sensors 4 are fixed to the internal support 3 by means of connectors 5 so that they can come into close contact with the inner surfaces of the external walls of the structural model 2.

The connectors 5 have to have enough stiffness to thus prevent occurrence of errors in measurements due to deformation caused by axial forces and shear forces.

The connectors 5 may have various shapes such as plates, bars, and the like.

The connectors 5 are desirably adjustable in length according to variations in distances between the internal support 3 and the external walls of the structural model 2.

In the conventional HFPI method, the internal space of the structural model is limitedly provided, the number of pressure tap tubes available is restricted, and the number of wind pressure holes for installing pressure taps is of course limited. Further, it is not easy to calculate the areas influenced by the wind pressure holes in a structure with a complex outer shape.

According to the present invention, contrarily, the shapes of the external walls do not matter, and irrespective of the shapes of the structure, accordingly, accurate loads can be calculated through the load sensors 4.

In specific, even in the case where parapets 23 are provided, as shown in FIG. 8, or even in the case where the structural model 2 has various elevational shapes, as shown in FIG. 9, accurate loads can be calculated through the wind tunnel test equipment for the respective structural models.

In the case of the existing aerodynamic wind tunnel test results, further, numerical analysis for post-processing after the test has to be needed, and accordingly, it is very important to obtain vertical distributions according to heights. According to the existing HFFB method, however, reaction forces to wind loads can be measured only on the base of the structural model.

According to the present invention, contrarily, wind loads applied to a given height can be accurately measured, and accordingly, the accurately measured values can be used usefully in the numerical analysis process.

As mentioned above, further, the conventional HFPI method is greatly influenced by the number of pressure taps installed on the external walls of the structural model. To accurately measure the loads applied to portions whose outer shapes are complex, such as corners, protruding portions, concave portions, and the like, further, the pressure taps have to be necessarily installed on the corresponding portions. However, the test result values are just approximate values.

According to the present invention, contrarily, accurate values, not approximate values can be measured through only the plurality of load sensors 4.

Unlike the conventional HFPI method in which there is a limitation in adding the pressure taps because of the restriction of the internal space so that it is hard to enhance a degree of accuracy of load distributions, the wind tunnel test equipment using wind force integration according to the present invention is provided with the load sensors 4 so that when the load distributions are calculated using interpolation, a degree of the accuracy in the calculation can be greatly improved.

Unlike the conventional HFPI method in which numerical analysis models are built with the result values measured through numerous pressure taps, the wind tunnel test equipment using wind force integration according to the present invention performs modeling for a relatively small number of measured loads, so that an amount of operation for the analysis can be substantially reduced to provide efficient calculation.

Based on a simple operating concept, the wind tunnel test equipment using wind force integration according to the present invention is widely applicable to a closed structure, a partially open structure, and various structures such as a cooling tower, a silo, a chimney, and the like (See FIGS. 10a to 10d).

In addition to buildings, as shown in FIG. 11, the wind tunnel test equipment using wind force integration according to the present invention is applicable to a bridge.

The loads applied to top and underside of a bridge are hard to be measured in the existing methods, but according to the present invention, the loads applied to top and underside of a bridge can be measured individually.

On the other hand, according to the conventional HFPI method, it is impossible to reuse the pressure taps and the pressure tap tubes used for one structural model after the test.

According to the present invention, however, the load sensors 4 and the internal support 3 are simply coupled to the structural model 2, and after the test, they are separated and reused several times, thereby providing economical advantages and being eco-friendly through the reduction of waste.

Figure 12:
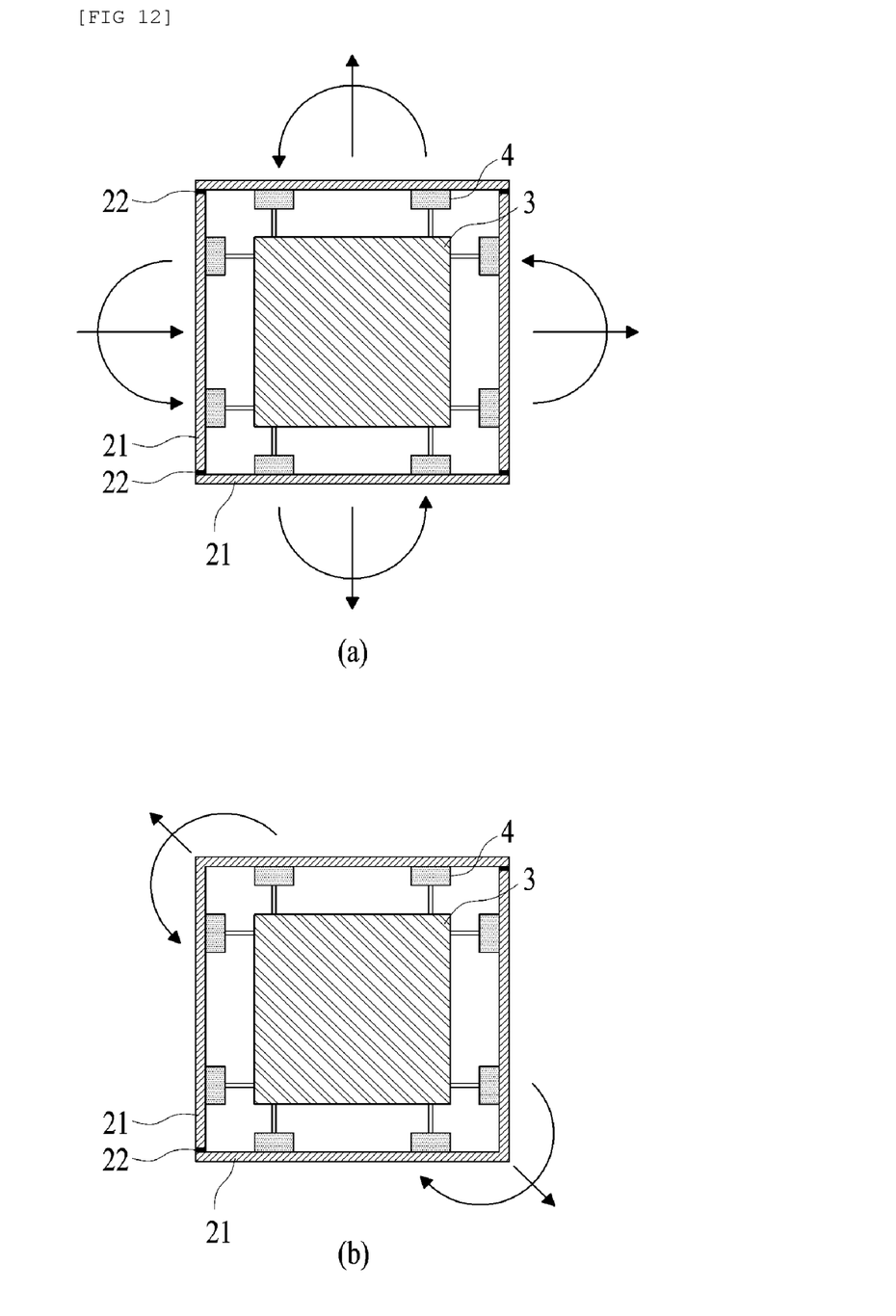
FIG. 12 illustrates schematic views (a)-(b) showing examples of external wall division of the structural model.

FIGS. 12a and 12b are schematic views showing examples of external wall division of the structural model.

As shown in FIGS. 4, 12a, and 12b, the external walls of the structural model 2 are divided into a plurality of segments 21 so as to accurately measure a total load applied thereto.

The number of external wall segments 21 is determined according to a degree of complexity of the outer shape of the structure, the types of load sensors 4 used, and degrees of accuracy of the measurement values required.

As shown in FIG. 4, the external wall segments 21 are provided by dividing the same external wall into a plurality of surfaces, and desirably, they are provided by dividing the structural model 2 by floor.

Further, as shown in FIGS. 12a and 12b, the external wall segments 21 are provided by dividing the respective surfaces of the structural model 2 on the plane, and otherwise, they are provided by dividing only some of corners on the plane.

Referring to FIGS. 12a and 12b showing examples of external wall division of the structural model, the external wall is divided into four segments and two segments, respectively.

Accordingly, local loads applied to the respective external wall segments 21 can be calculated so that it is possible to accurately design exterior materials.

According to the present invention, the load data measured on the respective external wall segments 21 of the structural model 2 are very accurate, and further, an amount of load data is smaller than that in the existing methods. Accordingly, the load data can be easily converted into numerical analysis models, and besides, they can be used usefully in performing the analysis of an integration model obtained by integrating the numerical analysis and the test results.

If the number of external wall segments 21 according to a height of the structural model 2 does not correspond to the number of floors of the structural model 2, interpolation has to be applied to obtain the vertical distributions of the loads, like the conventional HFPI method.

In this case, the interpolation is based on approximate values in the conventional HFPI method, but according to the present invention, the interpolation is based on accurately measured values, thereby obtaining the vertical distributions of the loads more accurately.

Figure 13:
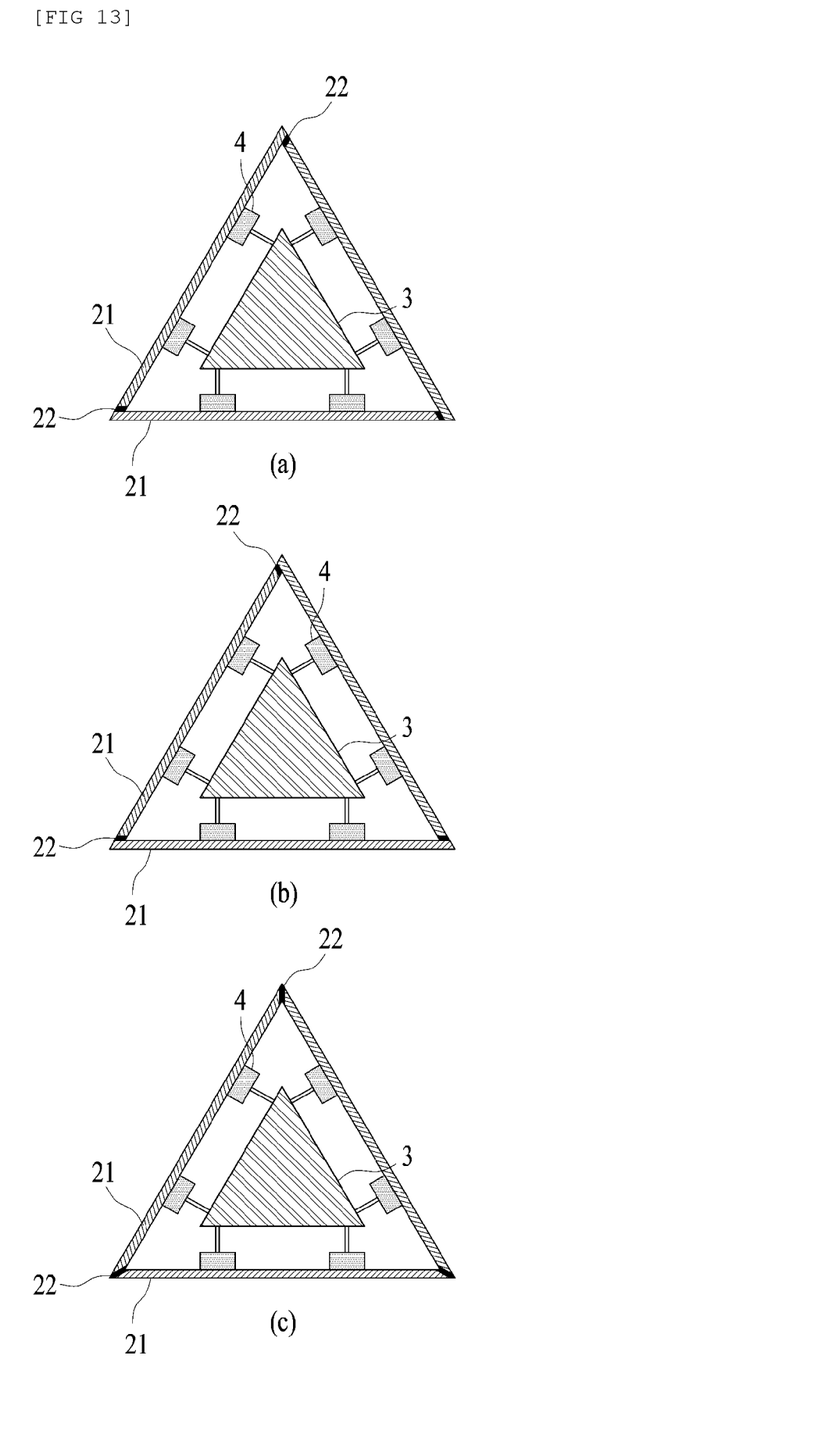
FIG. 13 illustrates schematic views (a)-(c) showing the wind tunnel test equipment according to the present invention wherein sealing materials are provided for triangular plane structural models.

FIGS. 13a to 13c are schematic views showing the wind tunnel test equipment using wind force integration according to the present invention wherein sealing materials are provided for triangular plane structural models.

As shown in FIGS. 12a to 13c, a sealing material 22 is disposed between the neighboring segments 21.

In specific, a gap between the neighboring segments 21 is filled with the sealing material 22 so as to prevent air flows from being influenced by the gap.

The sealing material 22 is flexible enough to allow the wall to move gently so that the load sensors 4 can measure the loads applied to the external wall segments 21 of the structural model 2.

The installation positions of the sealing materials 22 are determined in consideration of the sizes of the external wall segments 21 of the structural model 2, workability, and the types of sealing materials 22.

Further, the internal support 3 may be a rigid core.

In the case where only the aerodynamic forces applied to the structural model 2 are measured, the internal support 3 may be a rigid core.

In this case, the aerodynamic forces applied to the external walls of the structural model 2 are measured directly through the load sensors 4, and after that, the measured aerodynamic forces are inputted to the numerical analysis models and post-processed, thereby calculating resonant forces.

The internal support 2 may be an equivalent dynamic model of a structural system of a structure.

In the case where an aeroelastic structural model is needed so as to measure both of aerodynamic forces and resonant forces, like the structural model in the aeroelastic wind tunnel test, the internal support 2 may be the equivalent dynamic model, not the rigid core.

In the case of the HFPI model, numerous pressure measurement tubes are installed, and due to the limitation of space, accordingly, it is almost impossible that the equivalent dynamic model made by scaling the structural system of the structure is installed inside the structural model so as to provide an aeroelastic model.

According to the present invention, contrarily, there is no spatial limitation inside the structural model 2, and accordingly, the aeroelastic model can be easily applicable.

If the internal support 2 becomes the equivalent dynamic model, the aerodynamic forces and the resonant forces can be measured directly through the equivalent dynamic model, without any separate calculation.

INDUSTRIAL APPLICABILITY

According to the present invention, the wind tunnel test equipment using wind force integration is configured to directly measure the aerodynamic forces applied to the structural model as the reaction forces through the load sensors disposed between the external walls of the structural model and the internal support, so that even in the case of the structures having various shapes, the wind loads can be accurately calculated through the load sensors.

The invention claimed is:

1. Wind tunnel test equipment using wind force integration, comprising:
    a structural model (2) whose interior is empty;
    an internal support (3) disposed inside the structural model (2); and
    load sensors (4) disposed outside the internal support (3) and coming into close contact with the inner surfaces of the structural model (2) to directly measure aerodynamic forces applied to the structural model (2) as reaction forces.

2. The wind tunnel test equipment according to claim 1, wherein the structural model (2) has a plurality of segments (21) formed dividedly on the external walls thereof.

3. The wind tunnel test equipment according to claim 2, wherein the neighboring segments (21) have a sealing material (22) disposed therebetween.

4. The wind tunnel test equipment according to claim 1, wherein the internal support (3) is a rigid core.

5. The wind tunnel test equipment according to claim 1, wherein the internal support (3) is an equivalent dynamic model of a structural system of a structure.

\* \* \* \* \*